United States Patent
Lin

(10) Patent No.: US 6,920,044 B2
(45) Date of Patent: Jul. 19, 2005

(54) EXTENDIBLE AND FLEXIBLE HEAT-DISSIPATION AIR CONDUIT BASE AS COMPUTER HEAT DISSIPATION DEVICE

(75) Inventor: Chuan-Hung Lin, 3F, No. 12, Lane 45, Section 1, ChungHwa Rd., HsinChuang City, Taipei Hsien (TW)

(73) Assignees: Chuan-Hung Lin, Taipei (TW); Suramet Sajjaisariyavut, Ubonrajjatanee (TH)

( * ) Notice: Subject to any disclaimer, the term of this patent is extended or adjusted under 35 U.S.C. 154(b) by 0 days.

(21) Appl. No.: 10/677,233

(22) Filed: Oct. 3, 2003

(65) Prior Publication Data

US 2005/0073812 A1 Apr. 7, 2005

(51) Int. Cl.[7] .................................................. H05K 7/20
(52) U.S. Cl. ........................ 361/697; 361/695; 257/718; 257/722; 174/16.3; 165/80.3
(58) Field of Search ................................. 361/690, 694, 361/695, 697, 704, 719–721; 174/16.1, 16.3; 257/717–722; 165/80.3, 104.33, 122; 454/184; 277/602–609; 285/363–367

(56) References Cited

U.S. PATENT DOCUMENTS

| | | | | |
|---|---|---|---|---|
| 5,160,811 A | * | 11/1992 | Ritzmann | 174/68.3 |
| 5,566,377 A | * | 10/1996 | Lee | 361/695 |
| 6,113,485 A | * | 9/2000 | Marquis et al. | 454/184 |
| 6,236,565 B1 | * | 5/2001 | Gordon | 361/695 |
| 6,282,090 B1 | * | 8/2001 | Johnson et al. | 361/695 |
| 6,404,630 B1 | * | 6/2002 | Lai | 361/697 |
| 6,536,778 B2 | * | 3/2003 | Behil et al. | 277/609 |
| 6,542,361 B2 | * | 4/2003 | Paradis | 361/687 |
| 6,657,863 B2 | * | 12/2003 | Lee et al. | 361/697 |

* cited by examiner

*Primary Examiner*—Boris Chèrvinsky
(74) *Attorney, Agent, or Firm*—Bacon & Thomas

(57) ABSTRACT

The present invention is related to an extendible and flexible heat-dissipation air conduit base as computer heat dissipation device. The invention mainly comprises an air conduit and fixtures. The air conduit is hollow and flexible with fixtures at both ends. Each fixture is in rectangle shape and connects with the air conduit through a circular hole. The fixture also has several positioning holes and through holes for metal wire to pass through and secure the air conduit with the fixture. By this design, the fixture at one end of the air conduit connects to a heat dissipation fan for CPU. Thus, it provides an excellent heat dissipation channel for computer CPU and helps to achieve the desirable heat dissipation effect.

3 Claims, 5 Drawing Sheets

EXTENDIBLE AND FLEXIBLE HEAT-DISSIPATION AIR CONDUIT BASE AS COMPUTER HEAT DISSIPATION DEVICE

FIELD OF THE INVENTION

The invention relates to an extendible and flexible heat dissipation air conduit base as a computer heat dissipation device. Especially, the invention relates to a heat dissipation air conduit base that has features enabling fast and easy installation in a computer without interfering with internal hardware and provides a heat dissipation device to provide desirable heat dissipation effect.

BACKGROUND OF THE INVENTION

Traditionally, the heat dissipation device for computer was made of aluminum or copper into a heat dissipation plate (or heat dissipation paste) to provide a proper heat dissipation effect and prevent the operation of computer components (especially CPU) from being affected by high temperature due to continuously long operation. Practically, such heat dissipation plate had disadvantages like inconvenience in use, removal and replacement. Most seriously, the heat dissipation effect was poor. Presently, very few people are using it.

Therefore, the industry had further improved the traditional heat dissipation plate (or by using heat dissipation paste) by a new type of heat dissipation device, which adopted the major structure of traditional heat dissipation plate with a fan on top of the heat dissipation plate. Through the combined effect from fan and heat dissipation plate, the previously poor heat dissipation efficiency was improved and CPU received better heat dissipation than before.

The heat dissipation device combining fan and heat dissipation plate provided better heat dissipation effect than the traditional device. However, because computers continue to provide new and powerful functions with increasingly precision components and modules, the heat generation from continuous operation also continues to increase. Especially for solving internal temperature problem and complying with internal heat flow, it is apparent that current heat dissipation device fails to achieve effective heat dissipation. Under long term of use, it is hard to avoid instability for computer system due to poor heat dissipation for CPU or computer main unit. As a result, the user is irritated by this problem. Therefore, how to provide the computer with a fixed heat dissipation channel and effective heat dissipation is an urgent subject for the industry.

The inventor for the present invention aimed at the structural design in previous heat dissipation device that had problem with internal field and heat dissipation plate direction. The inventor also looked into the problem with internal temperature rise causing poor heat dissipation and was actively engaged in improving heat dissipation mechanism. After a long time and effort, the present invention was created.

SUMMARY OF THE INVENTION

The main objective for the present invention is to provide an extendible and flexible heat dissipation air conduit base as a heat dissipation channel in computer heat dissipation device. On one hand, it releases hot air through air conduit or introduces cold air from outside, so the problem with random internal flow field can be solved. On the other hand, it effectively lowers the internal temperature to increase the overall heat dissipation effect.

Another object of the present invention is to provide an extendible and flexible heat dissipation air conduit base in computer heat dissipation device, in which the air conduit fixture is made of aluminum to be capable of absorbing internal heat and facilitate lowering internal temperature.

Another objective for the present invention is to provide an extendible and flexible heat dissipation air conduit base in computer heat dissipation device. The air conduit connects to fan to form a closed system. It can block fan noise and further reduce computer operation noise.

To attain the above-mentioned objectives, the approach adopted in the present invention is to equip the heat dissipation air conduit base with air conduit and fixture. The air conduit is a hollow and flexible duct. At both ends of the air conduit, there is a fixture available to connect with different size fans. Each fixture has a rectangular shape and has a circular hole for connection with air conduit. There are several positioning holes with different diameters arranged in a circle available for connection with different sizes of CPU fans. Secured connection is made by passing screws through positioning holes or through holes. The fixture of the other end is used to connect with heat dissipation fan on computer case. In this way, a desirable air suction or discharge is achieved for effective heat dissipation for CPU operation. Since the air conduit is freely bendable so it can get around the components and modules in computer during installation. Besides, the fixture has through holes in the middle section at four perimeters to facilitate reversed U metal wire to pass through from rear edge of air conduit, so air conduit and fixtures are tightly connected.

To further demonstrate the structural characteristics and benefits of the present invention to the examiners, the following embodiments are given with detailed illustration as follows:

BRIEF DESCRIPTION OF THE DRAWINGS

FIG. 3A is a partial sectional view for the present invention.

DETAILED DESCRIPTION OF THE INVENTION

Figure 1:
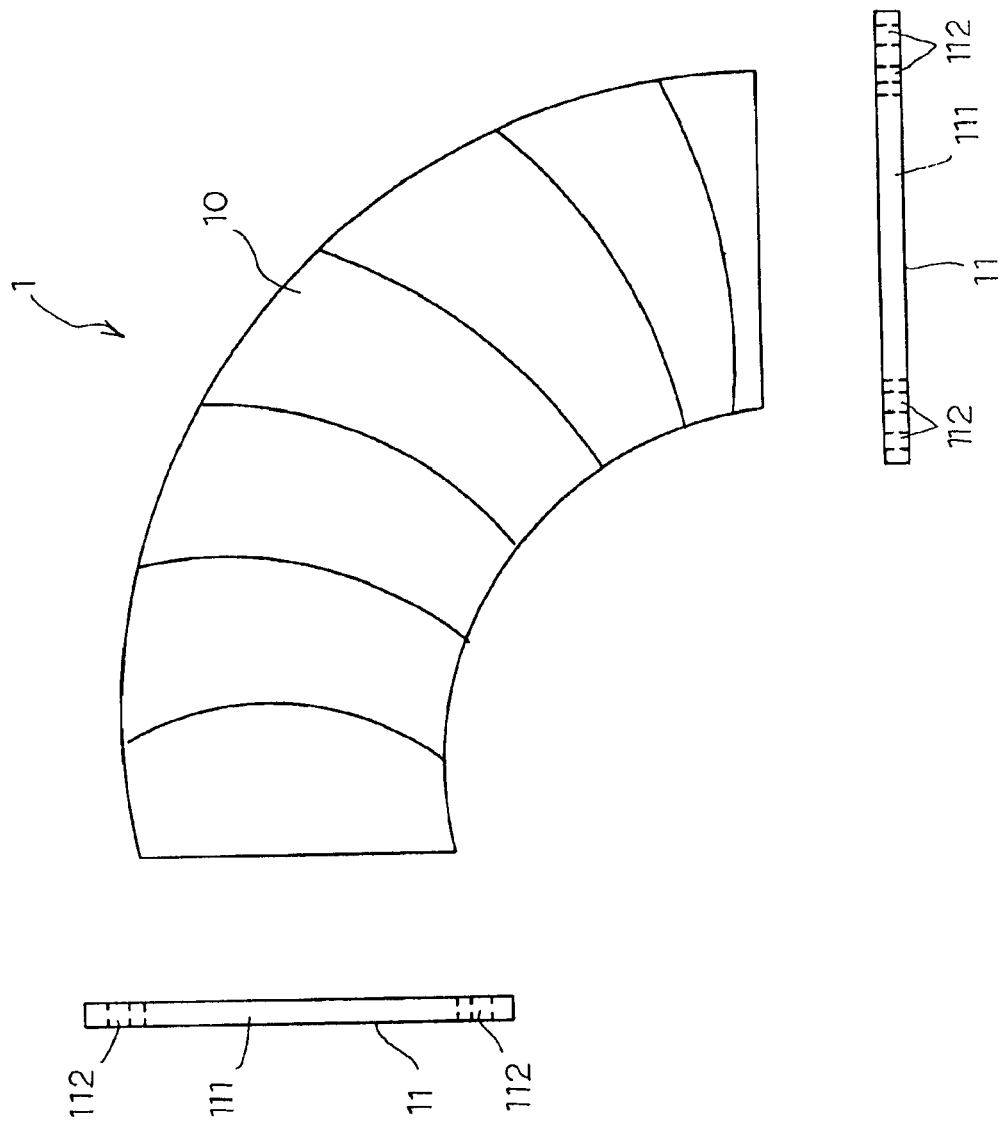
FIG. 1 is a three-dimensional disembly illustration for the present invention.
Figure 2:
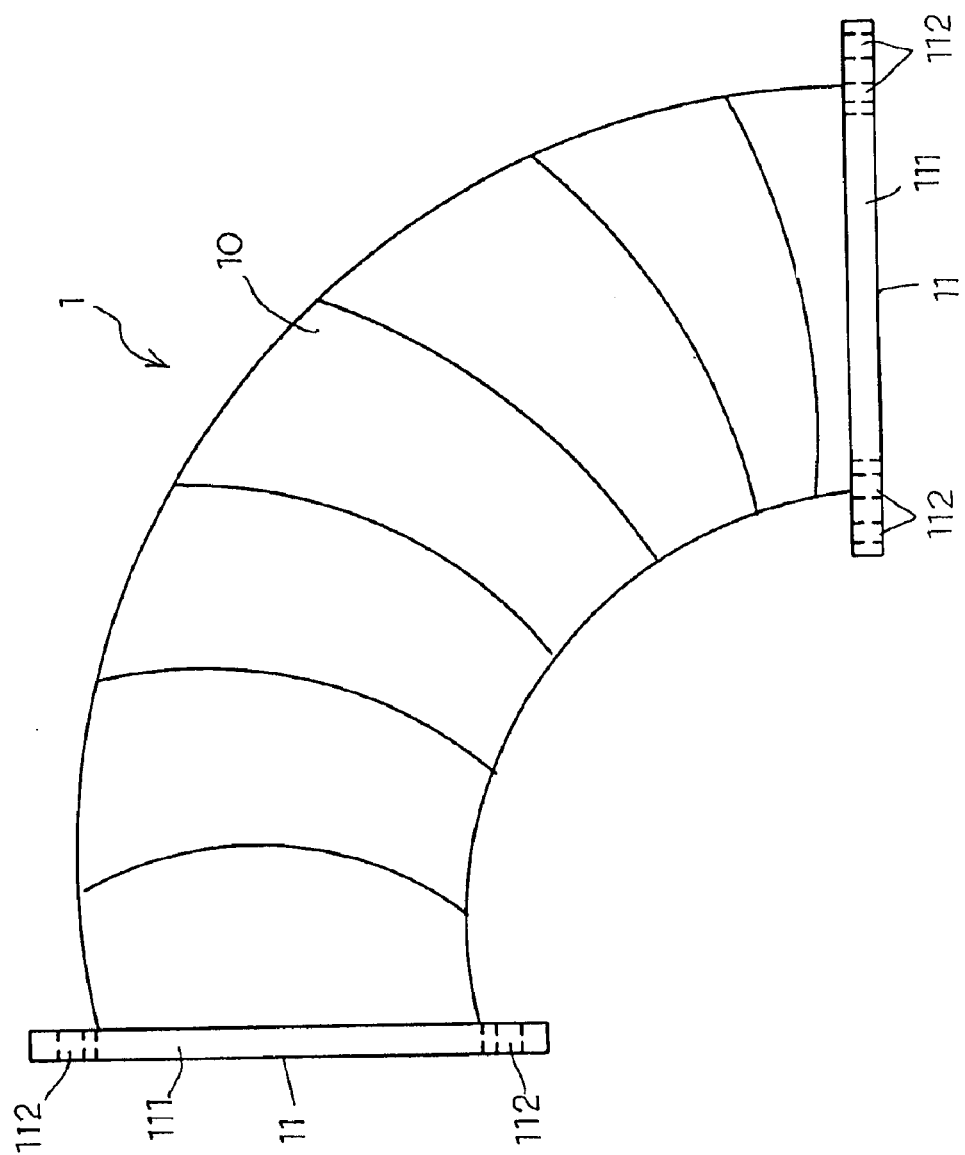
FIG. 2 is a three-dimensional assembly illustration for the present invention.
Figure 3:
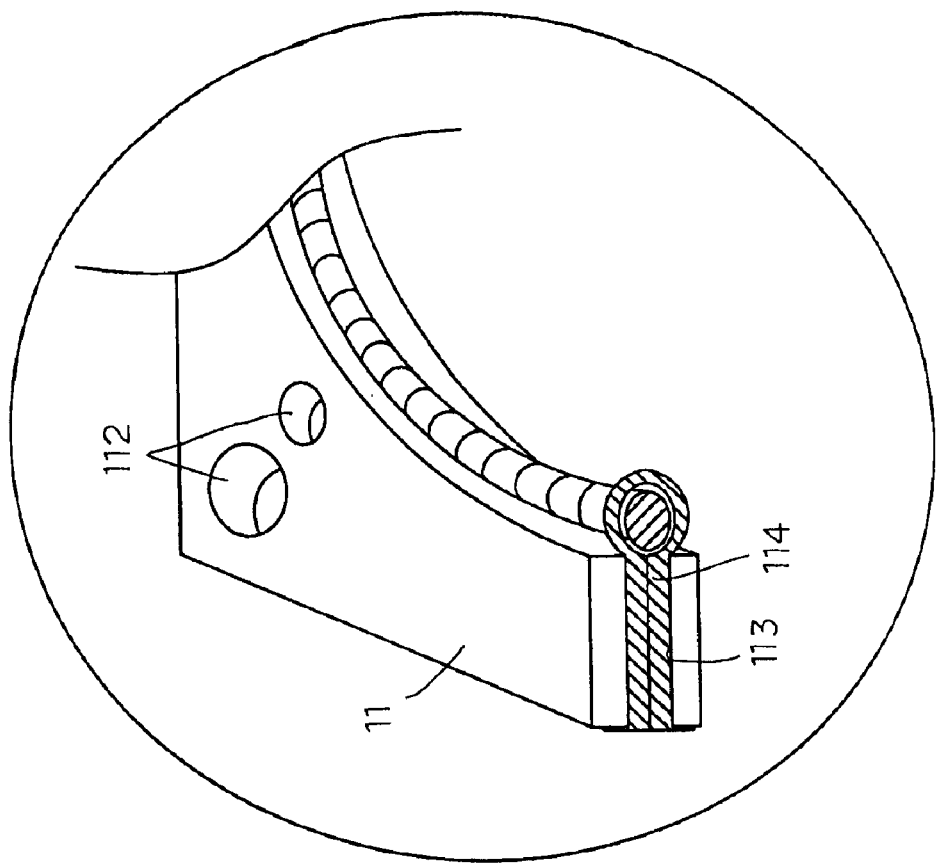
FIG. 3 is a two dimensional structural illustration for the present invention.
Figure 3:
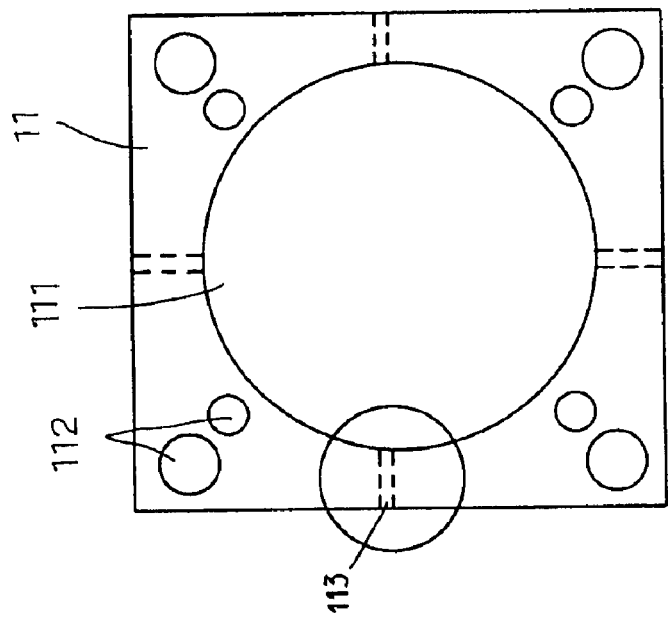

The present invention is to provide an extendible and flexible heat dissipation air conduit base in computer heat dissipation device. Please refer to FIG. 1 and FIG. 2. The air conduit base 1 comprises a flexible and hollow air conduit 10 and fixtures 11 at both ends for positioning and connection. Fixtures 11 have a rectangular shape and have a circular hole 111 in the center for connection with the air conduit 10. At each corner, there are positioning holes 112 for locking screws to pass through to facilitate installation on the heat dissipation fan 4 on computer case 3. The other fixture 111 is also rectangular and has a circular hole 111 in the center. At each corner, there are two sets of positioning holes 112 in radiating form. Each set of positioning holes 112 fit different size of CPU fan 2 and provides installation flexibility. Through this, the fixture 11 firmly connects with CPU fan 2 to provide effective heat dissipation. In the design of the air conduit 10 and the fixtures 11, there are through holes 113 in the middle section of four perimeters of the fixture 11 for the reversed U metal wire 114 to pass to the rear edge of the air conduit 10 and then go back to the through hole 113 of the fixture 11. Thus, positioning is achieved as in FIG. 3.

Figure 4:
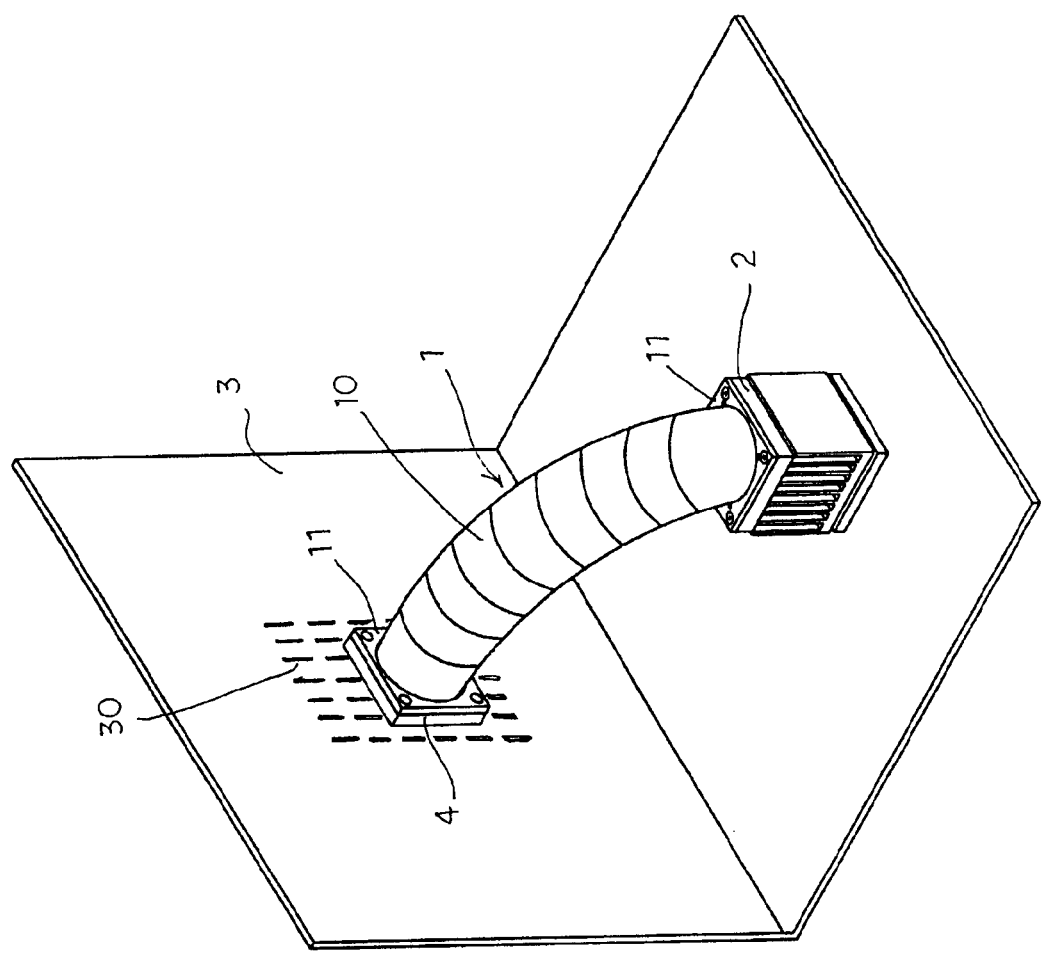
FIG. 4 is a preferred embodiment for the present invention.
Figure 5:
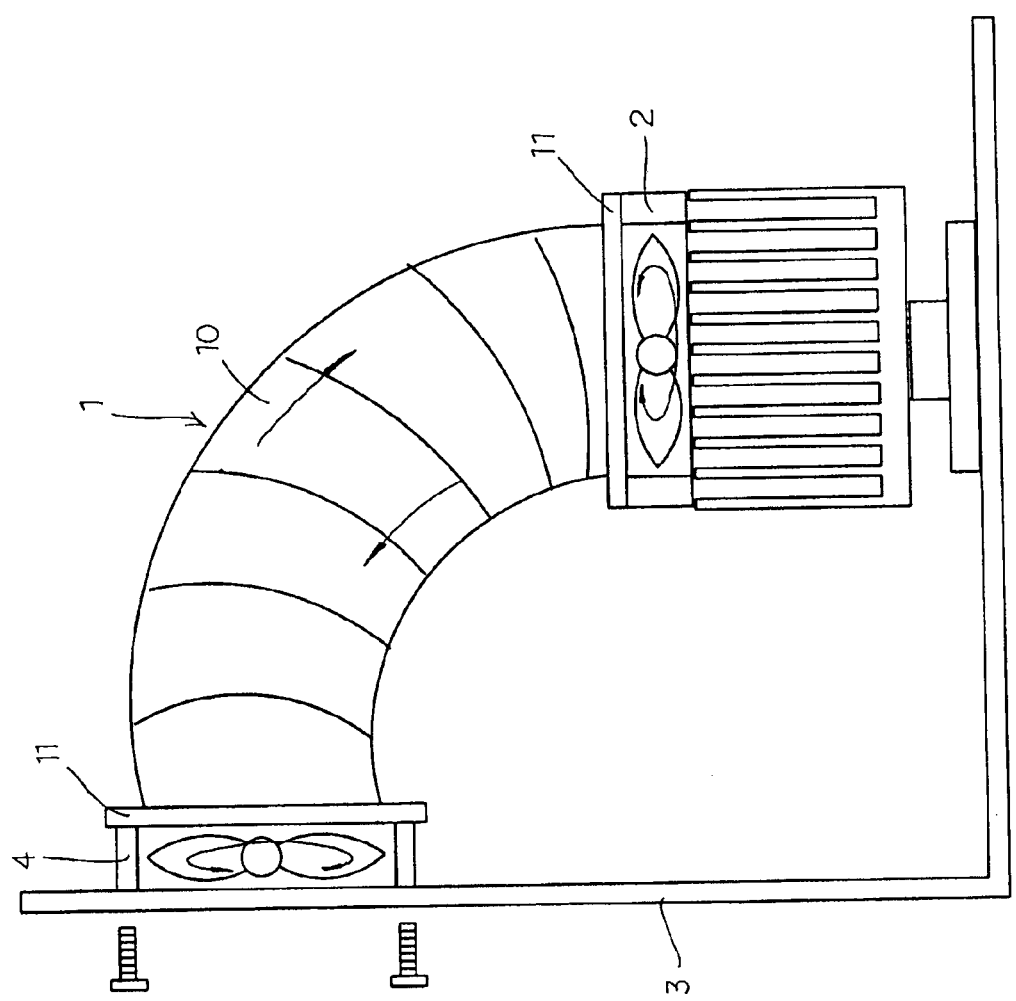
FIG. 5 is an illustration for air suction and discharge for the present invention.

The above is a general description for the structural characteristics for the extendible and flexible heat dissipation air conduit base in computer heat dissipation device in the present invention. For practical use of the heat dissipation air conduit base, please refer to FIG. 4. One fixture 11 of the air conduit base 1 connects to CPU fan 2. By passing screws through the suitable positioning holes 112 for the CPU fan 2, it is secured on the CPU fan 2. So the CPU fan 2 fits the circular hole 111 of the fixture 11. The other fixture 11 connects to computer case 3. The preferable connection is made by matching the heat dissipation holes 30 on the computer case 3, which a heat dissipation fan 4 is connected with. Then, by the same securing mode with passing screws through positioning holes 112, the fixture 11 is secured to heat dissipation fan 4. Assembly is thus completed. When computer is turned on, the heat due to CPU operation is sucked out by CPU fan 2. The hot air is directed through the air conduit 10 to the connection place where the other fixture 11 connects to the heat dissipation holes 30 of computer case 3. Temperature rise is minimized and turbulent airflow is reduced. Effective heat dissipation is achieved as in FIG. 5.

The above CPU fan 2 and the heat dissipation fan 4 on computer case 3 can adopt "air discharge" type at the same time. The heat generated by CPU is discharged through the air conduit 10 out of computer case 3. They can also adopt "air suction" type that sucks in cold air outside the computer case 3 to reduce the heat due to CPU operation. The air conduit 10 is made of aluminum, which absorbs internal heat of computer case 3 and facilitates lowering internal temperature of computer case 3.

When the above heat dissipation air conduit base 1 is installed on computer case 3, if the case is too large, additional air conduit base 1 can be used to connect to the fixture 11 by passing screws through the positioning holes 112 and form a prolonged air conduit base 1 in an easy installation.

Besides, the air conduit base 1 in the present invention practically connects its both ends to CPU heat dissipation fan 2 and heat dissipation fan 4 on computer case 3. So the operation noise is completely blocked by the air conduit 10 and reduced effectively.

The heat dissipation air conduit base 1 in the present invention has an extendible and flexible air conduit 10, which under practical installation situation can get around components and modules in computer. One end of the air conduit base 1 has a fixture 11 for connection with CPU fan 2. In design, the fixture 11 has several positioning holes 112 to fit different sizes of CPU fans 2. They are used for adjustment in installation to achieve the desired connection and provide installation flexibility and convenience in use.

In general, the heat dissipation air conduit base in the present invention provides an effective heat dissipation air conduit, easy and fast installation with fixtures. It also provides positioning function to different sizes of CPU fans. Among the similar products, there is no product like the invention that provides a stable heat dissipation channel and benefit. The application of invention type of patent is thus filed.

What is claimed is:

1. An extendable and flexible heat dissipation air conduit computer heat dissipation device comprising an air conduit and fixtures;

said air conduit is hollow and flexible;

a rectangular fixture attached at each end of the conduit for positioning and securing, each said fixture has a circular hole in a center thereof and several positioning holes;

said fixtures have several through holes in a middle section at four sides of the perimeter to receive a U-shaped metal wire to pass through and connect said air conduit tightly to the fixtures;

and wherein said two fixtures connect respectively to a CPU fan and a heat dissipation fan on a computer case to provide a heat dissipation channel.

2. The extendible and flexible heat dissipation air conduit computer heat dissipation device of claim 1, wherein at each corner of said fixture there are two sets of radially positioned holes, said radially positioned holes are used to fit different sizes of CPU fans and to provide installation flexibility.

3. The extendible and flexible heat dissipation air conduit computer heat dissipation device of claim 1, wherein said air conduit is made of aluminum.

* * * * *